(12) United States Patent
Garlington et al.

(10) Patent No.: US 8,879,782 B2
(45) Date of Patent: Nov. 4, 2014

(54) PROJECTOR LIGHT BULB

(71) Applicant: Disney Enterprises, LLC, Burbank, CA (US)

(72) Inventors: Joseph O'Brien Garlington, La Crescenta, CA (US); Brent David Strong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 137 days.

(21) Appl. No.: 13/744,212

(22) Filed: Jan. 17, 2013

(65) Prior Publication Data

US 2014/0198949 A1  Jul. 17, 2014

(51) Int. Cl.
*G06K 9/00* (2006.01)
*G03B 21/00* (2006.01)
*G03B 21/28* (2006.01)
*G03B 21/10* (2006.01)
*G03B 21/20* (2006.01)
*G06K 9/32* (2006.01)

(52) U.S. Cl.
CPC ............ *G03B 21/10* (2013.01); *G03B 21/2006* (2013.01); *G06K 9/3241* (2013.01)
USPC ............... 382/100; 382/103; 353/46; 353/98; 353/99

(58) Field of Classification Search
CPC ............... G02F 1/1336; G02F 2001/133627; G02F 1/133526; G03B 21/132; G03B 15/02; G06F 1/1639
USPC ................. 382/103; 353/119, 79, 71
See application file for complete search history.

(56) References Cited

U.S. PATENT DOCUMENTS

| | | | |
|---|---|---|---|
| 4,184,755 A * | 1/1980 | Burgess et al. | 353/45 |
| 7,550,935 B2 | 6/2009 | Lys et al. | |
| 7,871,192 B2 | 1/2011 | Chien | |
| 2003/0227765 A1* | 12/2003 | Kubo | 362/20 |
| 2007/0211475 A1 | 9/2007 | Sevack | |
| 2008/0042969 A1 | 2/2008 | Baker | |
| 2008/0136973 A1 | 6/2008 | Park | |
| 2009/0015799 A1* | 1/2009 | Luciano | 353/79 |

(Continued)

FOREIGN PATENT DOCUMENTS

| | | |
|---|---|---|
| CN | 102012623 | 4/2011 |
| JP | 2005099588 | 4/2005 |
| JP | 2006227143 | 8/2006 |
| WO | 2011117691 | 9/2011 |

*Primary Examiner* — Amir Alavi
*Assistant Examiner* — Kenny Cese
(74) *Attorney, Agent, or Firm* — Marsh Fischmann & Breyfogle LLP; Kent A. Lembke

(57) ABSTRACT

A display system that includes a projector light bulb. The system includes a light fixture with a conventional light bulb socket. A projector light bulb is provided with a socket adapter for mating electrically with the light bulb socket. A projector such as a pico projector is fit into the socket adapter or to mate with this adapter to be powered by the light bulb socket via the adapter. In lamp-type implementations, the projector is used to project onto a lamp shade-shaped rear projection screen or through a translucent shade and also upon surfaces of the ceiling or objects above the projector light bulb. A light conditioning or directing assembly may be provided that directs a portion of the projected light onto the projection screen (or shade) and another portion up onto the ceiling so as to concurrently focus on two or more surfaces at two or more focal distances.

6 Claims, 4 Drawing Sheets

(56) References Cited

U.S. PATENT DOCUMENTS

| | | |
|---|---|---|
| 2009/0141370 A1* | 6/2009 | Takaura et al. ............... 359/734 |
| 2009/0190044 A1 | 7/2009 | Chu et al. |
| 2010/0074284 A1* | 3/2010 | Aizawa et al. ............. 372/29.02 |
| 2010/0226617 A1 | 9/2010 | Picionelli |
| 2012/0044467 A1* | 2/2012 | Nakayama et al. ............. 353/85 |
| 2012/0058725 A1 | 3/2012 | Pan |

* cited by examiner

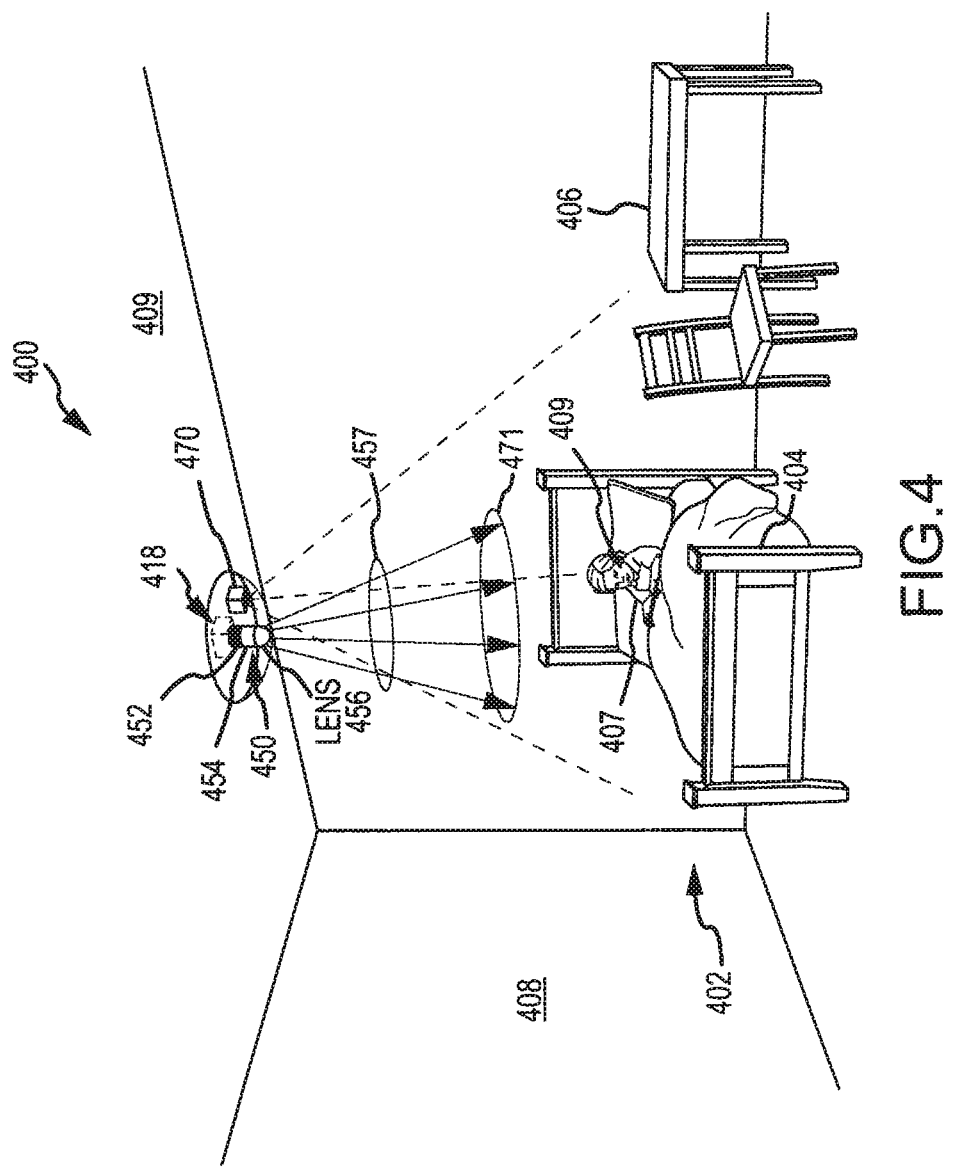

PROJECTOR LIGHT BULB

BACKGROUND

1. Field of the Description

The present invention relates, in general, to projection devices and methods, and, more particularly, to an audio, projection, and mapping system for use in small spaces such as bed rooms or family rooms in private houses, hotel rooms, receptions areas, waiting spaces/rooms, and the like.

2. Relevant Background

The consumer product, toy, entertainment, and guest hosting industries are always searching for new and unique ways to entertain people within their homes or guests and visitors of their facilities. For example, it is common for people in a waiting room or area to be entertained with piped in music or televisions or monitors playing network programming or programming selected for the locale that is being visited by those in the waiting room. In other settings, guests may be able to play a video game such as in a hotel or resort room or to interact with an interactive display on a wall or floor display such as in malls, amusement parks, and airports.

These displays are useful in entertaining the visitors or guests and making the waiting or resting time more enjoyable. However, the public has become accustomed to display or monitor-based entertainment, and audio has been used for over a century to create an experience or desired ambience. As a result, the hosting and entertainment industries including hotels and resorts continue to demand ways to keep their guests happy and to set the experiences they provide apart from the competition. For example, a resort associated with an amusement park may wish to not only provide a comfortable room to their guests but to also provide theme-based entertainment that the guests can interact with and control to provide a memorable stay.

To this end, some resort and hotel owners have looked for ways to turn a room or other space into a visually immersive environment to make the room different from a normal room. In some cases, it may even be desirable to allow use of the room or space for various kinds of play (such as when the resort targets families with children to visit), whereas a conventional hotel room is typically designed nearly to discourage such a use. For example, resort and hotel owners may quickly adopt a technology that turned a guest room into a fantasy environment like a land or space from a favorite movie or television show. In some cases, the guests (e.g., children) may be able to interact and play a game with movie, video game, or other characters such as tag or turn their room into a game environment that they can enter such as to a drive game vehicle (e.g., between a wall and a nearby desk or bed). If the technology is relatively inexpensive and simple to use, it may also become popular for residential use such as in a playroom or a bedroom.

SUMMARY

Briefly, the inventors recognized that a display system based on or using a projector light bulb may address the above problems by creating a projected display that can change a simple room into an immersive environment. The higher concept is to create a light bulb-type projection device that can be used to paint any surface it can reach with its light with any static or animated image, which can be conceived of for providing via a conventional projector.

In some preferred cases, the display system is configured such that the projector has an unlimited depth of focus, e.g., similar to a laser projector, but this functionality is not required to practice the inventive display system. For example, an unlimited depth of focus is not required in embodiments of the display system in which a projector light bulb (or light bulb projector) is combined with a lamp assembly with a shade-like projection screen. In this example, the projection screen is positioned at a known distance from the light bulb projector such that a fixed focal length lens/reflector assembly may be used to focus the projected imagery (or projected light) onto the inside (or projection) surface of the shade-like projection screen with no need for an unlimited depth of focus.

More particularly, a display apparatus is provided for projecting images in a room or similar space. The apparatus includes a light bulb projector assembly, which provides a bulb adapter for electrical connection (e.g., threaded mating) in a light bulb socket. The assembly includes a projector powered by the light bulb socket via the light bulb socket adapter. During use, the projector receives an image stream and, in response, projects light with imagery (e.g., a pico projector is used that is powered through an adapter screwed into a conventional light bulb socket). The apparatus further includes a lens assembly receiving the projected light and directing the projected light onto a projection surface.

In some implementations, the projector is first operated, prior to receiving the image stream, to project white or colored light, whereby the light bulb projector assembly illuminates a space around the apparatus (e.g., acts in a switched manner more as a conventional light bulb and as a projector). The apparatus may be provided in lamp-type arrangements with a harp supporting the light bulb socket and a projection screen (a lamp shade rear projection screen or the like) supported upon the harp with an interior surface extending about the light bulb socket and the received light bulb projector, whereby the interior surface provides at least a portion of the projection surface. In these cases, the projected light may provide images on the exterior surfaces of the projection screen and/or the projection screen may be at least translucent to the projected light (e.g., transmit the projected light out into the surrounding environment/room).

In some embodiments, the projection screen includes an opening at an upper end and wherein a portion of the projected light is directed out of the opening by the lens assembly to display the imagery on a surface above the apparatus. The lens assembly may be mounted on the harp a distance apart from the projector and may include a mirrored reflector with an exterior surface receiving a first portion of the projected light and directing it outward toward the interior surface. In such cases, the mirrored reflector may be bullet shaped and the lens assembly may further include a lens for receiving a second portion of the projected light and directing the second portion in a direction parallel to a central axis of an outlet lens of the projector, whereby the second portion is focused on a ceiling or surface above the apparatus.

In other cases, the lens assembly includes a rounded lens attached to the projector and spreading the projected light toward the projection surface. While in other cases, the lens assembly may include a first lens for focusing a first portion of the projected light on a portion of the projection surface at a first focal distance and further may include a second lens for focusing a second portion of the projected light on a portion of the projection surface at a second focal distance greater than the first focal distance. According to another aspect, the light projector bulb assembly may further include a wireless receiver, and the image stream may be received from a remote device via wireless communications (such as a user's remote smartphone, tablet, or game controller).

BRIEF DESCRIPTION OF THE DRAWINGS

FIG. 4 is a perspective view of a ceiling display system similar to those in FIGS. 1-3 that further includes a camera that may be used for providing object recognition data or feedback for use in selecting media and/or imagery for projection into a space such as a child's bedroom or a hotel room.

DETAILED DESCRIPTION

Figure 1:
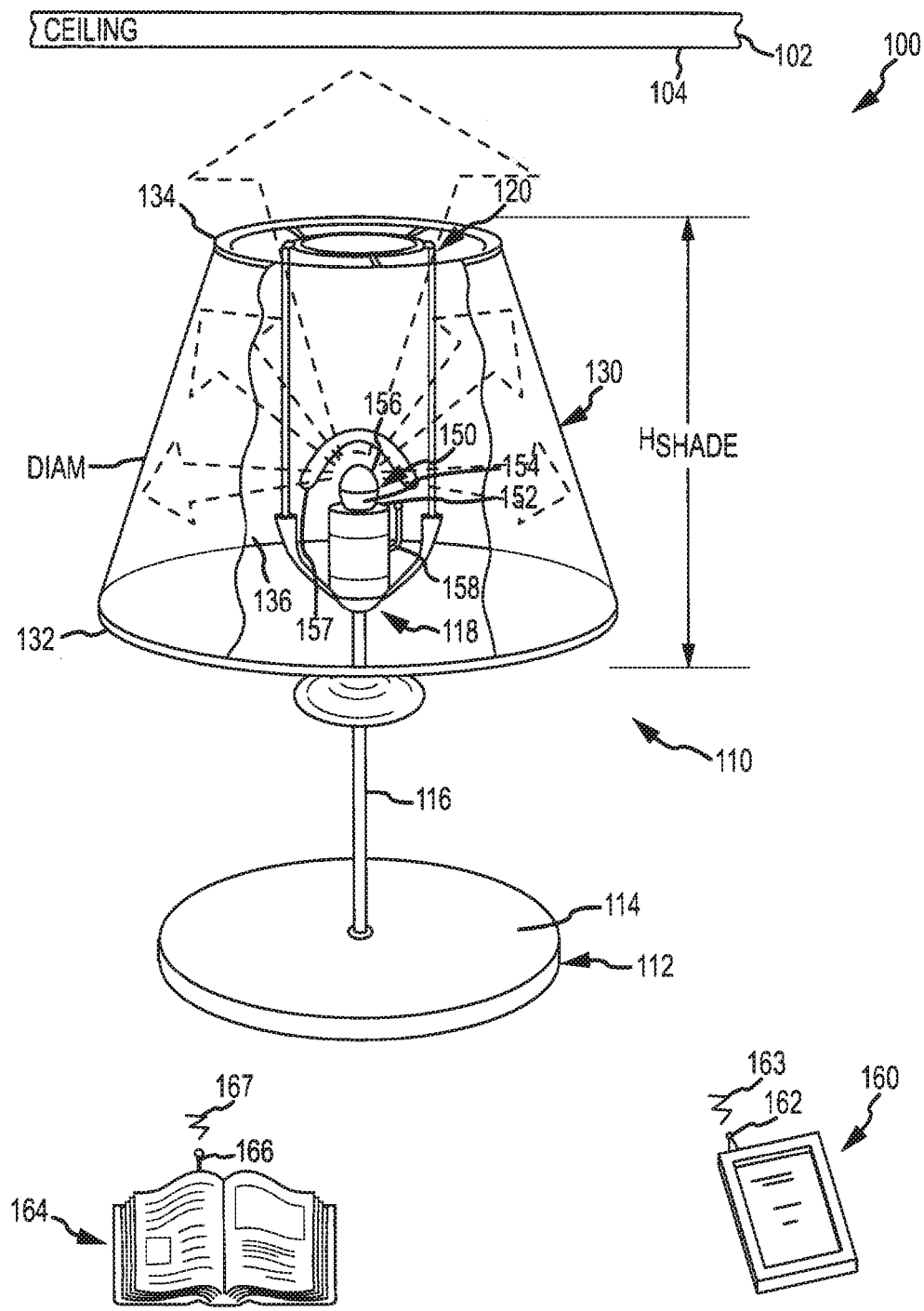
FIG. 1 illustrates a schematic and/or functional block diagram of a display system of one embodiment using a light bulb projector combined with a fixed-distance projection screen in the form of a lamp shade and with wirelessly-communicated media/data for projection with the projector.

Briefly, the present description is directed toward a display system for use in smaller spaces such as a hotel or resort room, a residential room such as a playroom, a bedroom, or the like, or other room where it may be useful to provide an immersive and entertaining display. On a higher level or concept level, the display system includes a small video projector, and the projector and its attendant hardware are adapted with a socket adapter for being screwed or inserted into a conventional or standard light bulb socket.

Hence, the projector may be considered a projector light bulb or light bulb projector as it is powered and positioned (physically supported) similarly to a light bulb in a conventional table lamp, floor lamp, or ceiling light fixture. The light bulb projector is adapted (with output lenses and the like) for projecting imagery onto interior or projection surfaces of a projection screen shaped like or in the form of a lampshade and/or into the room (e.g., onto the ceiling or walls of the room) in which the lamp or other bulb-based light fixture is placed for use.

One skilled in the art will recognize that the display system (audio and projection as well as mapping system) may be used for play at home (and the like) and also by the entertainment industry for use outside of traditional theaters. The following description may more heavily stress use of the display system outside of the home but use for entertainment inside the home is also intended to be covered by this description and accompanying claims.

For example, one may think back to their childhood when movies, television, and radio were cool and exciting but games were often not thought of as new and fun. Media was high tech while games were old fashioned, with pinball and bowling being about the only technology-oriented play available to many (e.g., pre-video games, computers at home, and handheld devices). However, with the invention of Pong and other video games, things began to change and games became cool to play, too. Part of the challenge today is that traditional play is old school. Part of what drove the inventor to create the display systems described herein is bringing play with toys into the same technological world as other modes of entertainment.

For instance, right now if one plays a car racing game on a computer they not only drive the cars, they also hear them, hear other cars, hear the crowd, see fiery crashes, hear the explosions, and the game play is back-grounded by emotional music and the like. If they play with a slot car, they only get to drive a car. There are few sounds, certainly no background music to amp up the emotions. When they play on a screen the world is completely surrounding and immersive, they only have to move by brain through the frame of the screen bezel and they are into another world. If they play in their room none of this is true. The goal of the projector with its camera and audio attachments of the display systems described herein is to allow a room, where ever the room is located, to become as immersive as any screen environment or even more so.

To this end, the display system is a device that can be both an input and an output device. On the output side, the display system is (or includes) a projector of still or animated visual imagery, and the display system may include (although not shown in all figures) a speaker or otherwise be capable of sending audio signals to speakers elsewhere in the room. In this way, the display system may provide an audio track to projected imagery to enhance the display and/or gaming experience.

Further, the display system may include a camera bore sighted in alignment with the projector so that image recognition hardware and software provided either as a part of the base device or provided by outside sources can see and map the room into which the projection is being made. In that way, imagery can be deformed in real time to correctly map it to the shapes onto which it is going to be projected. That would allow the projections, for instance, to be "cave-like" in their use and be calculated to the perspective of a single or key viewer in the room. In that instance or implementation of the display system, all images (or many images) may use a single point perspective based upon the eye or head position of a key person in the room, which gives the imagery a perception of depth even when 3D glasses are not worn.

FIG. 1 illustrates one embodiment of a display system 100 that is useful for implementing the above high level concepts to provide a desirable display within a room or display space (e.g., a reception area of a resort, a waiting line area for a ride, or the like). The display system 100 is shown to include a projection assembly 110 that may be used to project upon surfaces of a room or space with the display system 100 shown to project at least some light/imagery 156 upon a surface 104 of a room ceiling 102.

The projection assembly 110 in this example takes the form of a table or floor lamp with a base 112 and a vertical support rod or column 116 extending upward a distance from the base 112 to support other components of the projection assembly 110. In some embodiments, one or more surfaces 114 of the base 112 may provide a touch sensor or touch-sensitive interface to allow a user of the projection assembly 110 to interact with and/or control operation of a light bulb projector 150. For example, a first touch of interface 114 may turn the projector 150 on and a second touch may turn the projector 150 off. In another example, each touch of the interface 114 may cause the projector 150 to show a different still or video image in its output light 156.

The projection assembly 110 further includes a light bulb socket 118 supported on the end of the column 116, and this socket 118 may be a conventional light socket providing power to a received light bulb or, in this case, a light bulb projector 150 with a light bulb socket adapter 152 (or, more simply, a socket adapter). Power lines/electrical lines may be run through the column 116 to the socket 118, and the projection assembly 110 may be plugged into a conventional wall receptacle as is the case for a conventional lamp.

The projection assembly 110 includes a harp or supportive frame 120 extending upward from and mechanically connected to the column/rod 116, and the harp 120 is used to support and position a projection screen 130 about the periphery of the light bulb socket 118. As shown, the projection screen 130 takes the form (shape and size) of a conventional lamp shade, which is shown in partial cutaway to reveal the light bulb socket 118 and harp 120, and the screen 130 extends upward from a first or lower end 132 to a second or upper end 134.

The body of the screen 130 forms a projection or interior surface 136 facing inward toward the light bulb socket 118, and the screen 130 may be cylindrical in shape or frustoconical as shown with a larger diameter, Diam, at the first end 132 and a smaller diameter, Diam, at the second or upper end 134. The material used to form the screen 130 may be similar to that of a conventional rear projection movie screen such that when still or video images are projected by the light bulb projector 150 as shown at 157 the images are readily visible to observers of the projection assembly 110. In other cases, the screen 130 is formed of a material that may range from transparent/translucent to more opaque. In some embodiments of the assembly 110, the projection screen 130 may be switchable from a translucent to opaque state to a transparent to translucent state (e.g., opaque when the light bulb projector 150 is off or not projecting light 157 and transparent to translucent when the light bulb projector 150 is on or projecting light 157). The use of a screen 130 that is at least translucent to light 157 (e.g., a light transmissive screen 130) from the light bulb projector 150 allows imagery to be projected outward into the space/room in which the projection assembly 110 is positioned.

Significantly, the projection assembly 110 further includes the light bulb projector 150 that operates (when powered via socket 118) to project video or still images (or projected light) 157. This projected light 157 may strike the interior or projection surface 136 of the screen 130 and also is transmitted outward through the opening in the screen top end 134 onto a surface 104 of the ceiling 102 (or any other object above the projection assembly 110).

To this end, the light bulb projector 150 includes a socket adapter 152 that allows the light bulb projector assembly 150 to be threaded/screwed or otherwise inserted into the light bulb socket 118. The light bulb projector 150 further includes a projector of projection element 154, and the socket adapter 152 is configured to receive power from the socket 118 and power the projector 154. The projector 154 may take the form of a still or, more typically, video projector such as commercially available pico projectors or a custom fabricated projector that has a form factor allowing it to be placed in a socket adapter 152.

As shown, a rounded lens 156 is provided to condition or focus the output of the projector element 154. For example, the lens 156 may be chosen to suit the projection screen 130 (i.e., to focus the light 157 onto the surface 136), which provides a projection surface 136 at a fixed and known focal distance from the projector element 154 and with a known size as defined in part by the height, $H_{shade}$, of the screen 130 (e.g., 6 to 36 inches or the like). The use of a fixed focal point is useful in some applications to provide a higher definition/quality image with the display system 100. Concurrently, the lens 156 may condition light that passes through the opening at shade end 134 to provide a desired effect or look of imagery provided to ceiling surface 104. The lens 156 may be formed of glass, plastic, or a ceramic. As can be seen in FIG. 1, the projector light bulb 150 is topped with a lens 156 that may be a very wide angle lens to spread the imagery 157 widely throughout the environment (when the screen 130 is at least translucent) and/or over the projection surface 136 of screen 130. In some embodiments (not shown), the lens 156 may be omitted with the light bulb projector device 150 relying on the output lens of the projector element 154 to provide the light/imagery 157.

The light bulb projector 150 may receive its video/still image feed from a hardwired connection via the column 116, socket 118, and socket adapter 152, with a controller selectively operating the projector element 154 to project video or still imagery 157. In other cases, as shown, the light bulb projector 150 includes a wireless receiver (e.g., a radio or WiFi antenna/receiver) 158 that functions to receive wireless transmissions of data that are used to control the projector element 154 to produce imagery/projected light 157. In this case, the display system 100 may include one-to-many devices that transmit control signals/data to the light bulb projector 150.

For example, a computer or other electronic device 160 (e.g., a handheld device such as a tablet, a smartphone, a notebook, a computing pad, a video game controller, or the like) with a transceiver 162 may be used to connect (e.g., via radio or any useful wireless communication protocol) with the light bulb projector 150 and transmit 163 data (data defining a video image stream) useful in generating the projected light 157. In other cases, a book 164 may be provided in system 100 that is adapted with a transceiver 166 for providing wireless control signals 167 to the projector element 154 via antenna/receiver 138 In this manner, the display system 100 may be operated in a user-controlled or interactive manner to create an immersive and unique environment with images that may correspond with the content of the book 164 and/or the display of the device 160.

In implementing of the system 100, the socket 118 provides light bulb projector assembly 150 its power and, optionally, is also the path for data (generally, imagery, audio, and camera-based images being sent back to the computer or other media-providing technologies) to be delivered to the projector element (e.g., a micro or pico projector) 154 via socket adapter 152. The data path may also be provided by the radio transceiver assembly 158 or any other technology that is adapted to deliver imagery to be projected 157 to the projector element 154. Preferably, such wireless technology is configured to be packaged into a form factor that is reasonably small to mate with or be inserted into the socket 118.

In some applications of the display system 100, the projector element 154 first acts as a light bulb. In this first or default operating state, the projector element 154 is operated to project 157 white light (as most conventional light bulbs), colored light, or light patterns (as may be user-determined or defined with a controller 160, 164, or interface 114 such as with tapping to sequence from white to colored or patterned light or the like). Further, the projector element second acts as a projection device with the projected light 157 displaying video or still images on the surface 136 (or into the room of screen 130 is transparent or at least translucent to light) and on the ceiling surface 104. The imagery to display is received via signals 163, 167 with receiver 158 or via socket 118 and a media controller (not specifically shown).

Projector light bulbs such as assembly 150 may be used individually or in groups of two or more. In the latter case, the groups of assemblies 150 may be networked together to provide their images 157 that can provide overlapping images useful to form larger single images, to create surround-type visually immersive environments and so forth. The media used to operate the projector light bulb 150 may be provided by any number of sources, but one consideration may be that the display system 100 and its displays with light 157 can be easily updated so that the projector light bulb 150 may be used by the inhabitants of a space for many different purposes including, but not limited to, dimmed lighting, adding colored lighting to the space, placing pictures and/or animations/video upon walls, ceilings, furniture and other surfaces of the space, and providing interactive imagery used in play by the inhabitants.

Additionally, in many instances, the projector light bulb (such as assembly 150) may come with interfaces that would allow the source to modify or branch imagery based on user input. For example, the interface 114 or a touch sensor interface in screen 130 or the devices 160, 164 can be used by a user to interact and control the display 157. In this way, the projector bulb 150 may become the source for many kinds of interactive play, essentially making sections of rooms, whole rooms, and other spaces into interactive video spaces that surround and immerse users in stories and games (e.g., a video game leaps off of a flat display screen into the player's room or play space).

In other embodiments or uses of the system 100, the light bulb projector 150 receives data that allows it to change its function (as directed by an attached or remote device) and function as a still or moving image projector. In other words, this may be the second operating state discussed above with the light 157 being projected light providing imagery, for example, on rear projection screen 130. The bulb assembly 150 can receive imagery to be projected from a computer or other source located at the projector or, more typically, located remote via the power cable and socket 118 or in a wireless manner.

Figure 2:
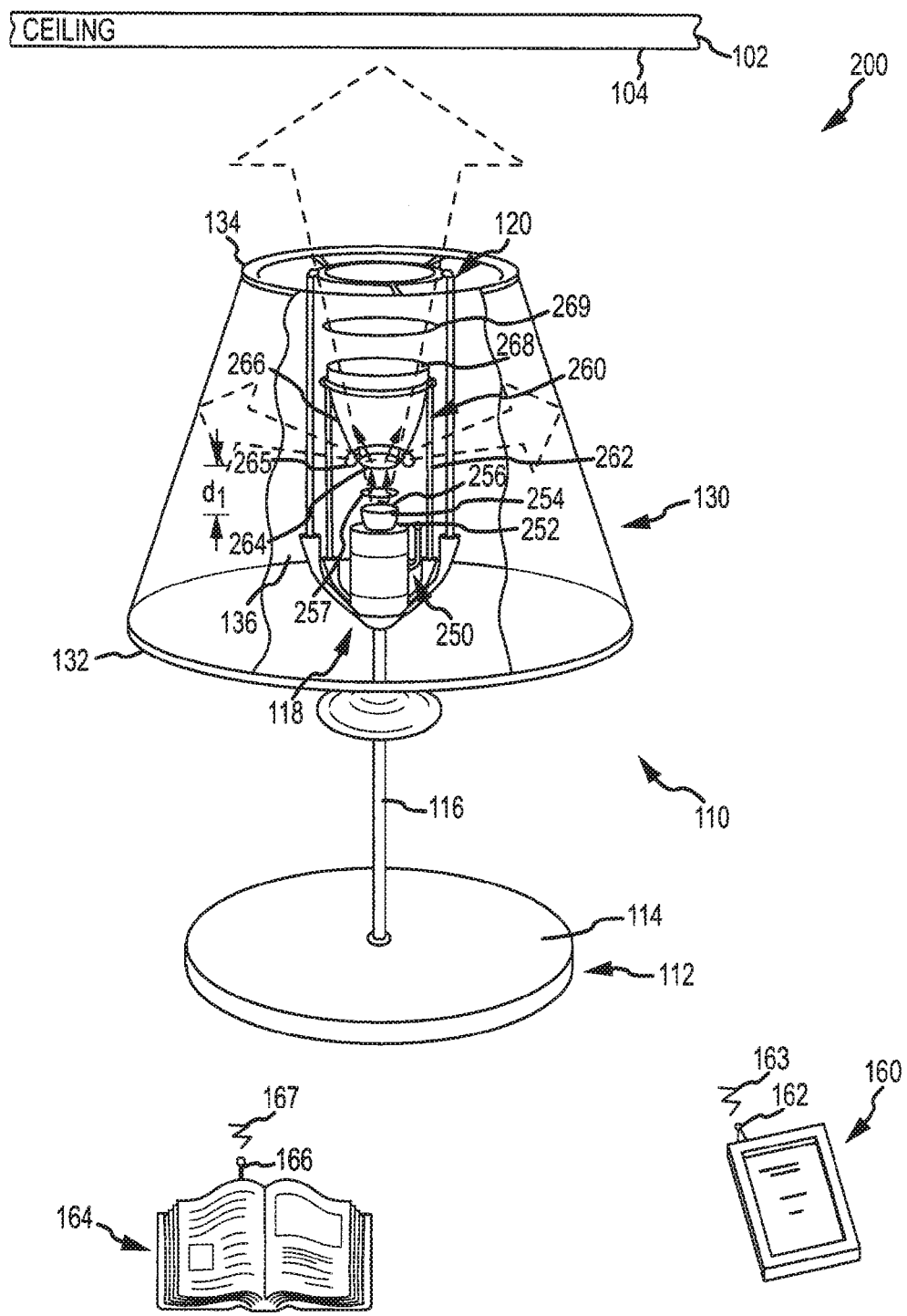
FIG. 2 illustrates another embodiment of a display system similar to that of FIG. 1 with a differing lens assembly or light conditioning assembly provided adjacent to the light bulb projector.

FIG. 2 illustrates another display system 200 of the present invention. Components that were also presented in display system 100 are given like numbers and the description provided above is applicable here (and not repeated for the sake of conciseness). The display system 200 is similar to that of system 100 in that the projection assembly 110 takes the form of a conventional lamp with a base 112, a bulb socket 118, a harp 120, and a shade-shaped projection screen 130 supported upon the harp 120 to enclose the bulb socket 118.

The system 200 differs from system 100 in that a rounded output lens is not included/used at the outlet of the projector element. Instead, the system 200 includes a light bulb projector 250 that includes a socket adapter 252 for mating with light bulb socket 118. A projector element (such as pico projector) 254 is fitted into the adapter 252 (or may extend outward some distance to suit the form factor of a particular projector). An outlet lens or projector cover 256 may optionally be provided with the assembly 250 to direct the projected light 257 upward onto a lens (or light conditioning) assembly 260.

The lens assembly 260 includes a lens support frame 262 that may extend up from the column/rod 116 as shown or it may be attached to the harp 120. The frame 262 includes one, two, or more rods that act to locate the assembly 260 within the display system 200 relative to the projector outlet lens/cover 256. Particularly, the lens assembly 260 is shown to include a first or lower lens 264, a mirrored reflector 266, and a second or upper lens 268. The frame 262 is configured such that a center axis of these three devices is concurrent with (or parallel with in some cases) a central axis of the projector outlet lens/cover 256. Further, the frame 262 is configured to place the first lens 264 at a predefined first focal distance, $d_1$, from the projector outlet lens/cover 256. The focal distance or separation distance, $d_1$, is chosen to suit the projector 254 or its output lens 256 but may be 2 to 12 inches or the like. The first or lower lens 264 is configured or shaped to direct a portion 265 of the projected light 257 radially outward from the central axis of the lens assembly 260 onto the projection surface 136 of the screen 130 (or out into the room if the shade 130 is removed).

Another fraction/portion 265 of the projected light 257, though, is transmitted through the first/lower lens 264 and directed into the mirrored projector 266. The mirrored projector 266 may be frustoconical in shape (with an increasing diameter from bottom to top in its circular cross section such as from 0.5 to 4 inches at the bottom up to 1.5 to 8 inches at the top) or bullet-shaped as shown with internal surfaces treated to provide a reflective surface or formed of a reflective material. In this way, light 265 that enters the reflector 266 is directed upward to the second or upper lens 268. The upper lens 268 may be configured to focus the light 269 onto the ceiling surface 104 so as to provide higher quality/better definition images projected onto ceiling 102. The lens assembly 260, thus, allows the light bulb projector 250 to be used to project using two (or more) focal distances. In this instance, the mirror/lens of assembly 260 redirects the projector light/images and can be said to be mounted on its own harp 262.

Figure 3:
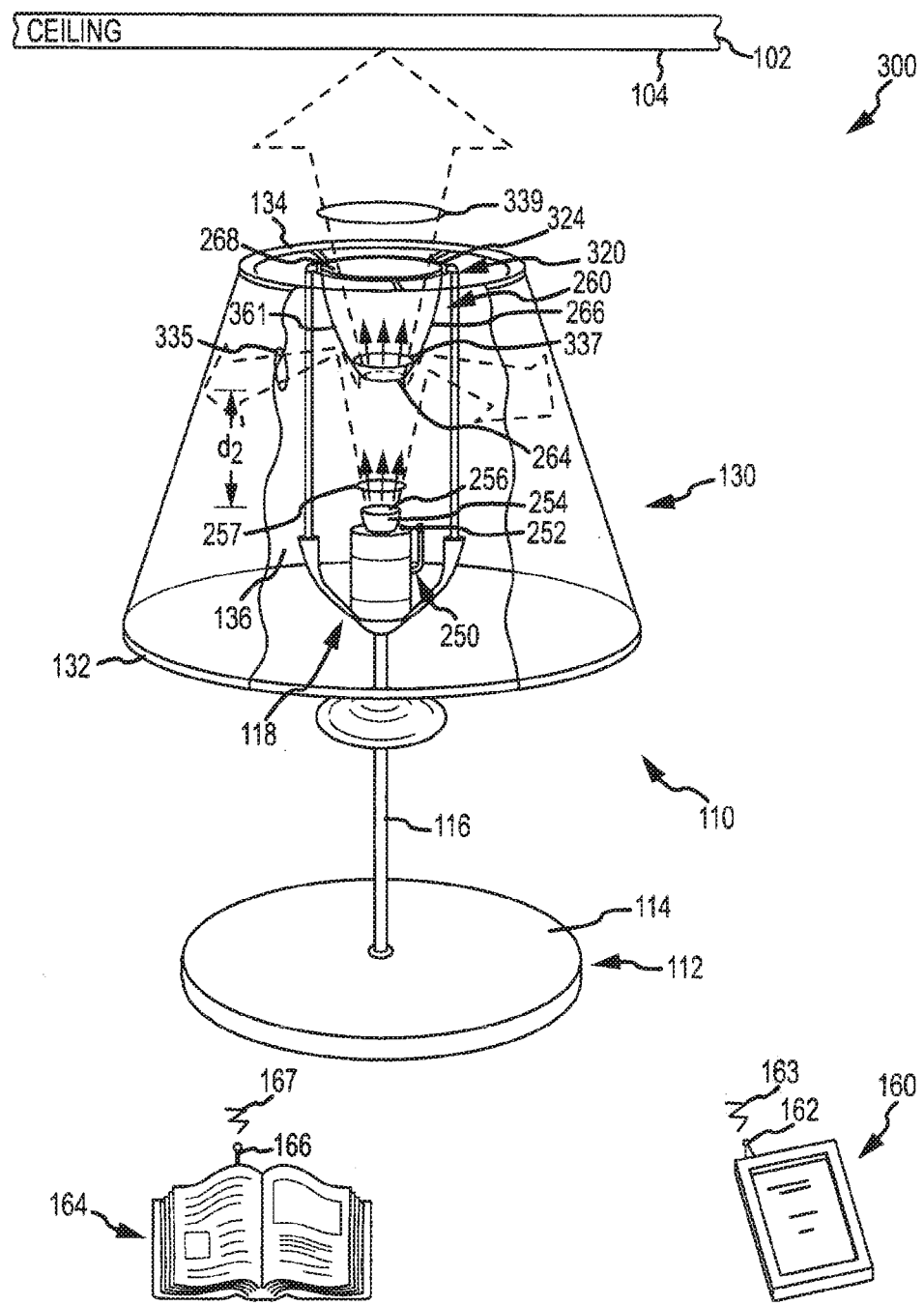
FIG. 3 illustrates a display system similar to that of FIG. 2 with the lens assembly spaced a greater distance from the output lens of the light bulb projector and supported by an upper frame element of a lamp shade harp (or lamp shade support)

FIG. 3 illustrates another display system 300 similar to system 200 of FIG. 2 (with like components having the same reference numbers). The system 300 has a projection assembly 110 with lamp configuration with a bulb socket 118. The projection assembly 110 includes the light bulb projector 250 of the system 200 of FIG. 2. But, the projection assembly 110 differs in that the lens assembly 260 is supported at a greater separation or focal distance, d2, from the projector outlet lens/cover 256.

As shown, the lens assembly 260 is mounted directly to the harp 320 that is configured with a support structure/frame 324 for receiving the assembly 260. The lens assembly 260 may be received in the frame 324 such that the second or upper lens 268 is flush with the upper edge or top 134 of the screen 130 (but this is not required). The first or lower lens 264 is positioned at the focal distance, $d_2$, such as 6 to 24 inches or the like. In this embodiment, the projected light 257 has dispersed or spread from the central axis of the projector outlet lens/cover 256 such that it strikes the exterior of the reflector 266. Hence, the exterior surface 361 is mirrored (or reflective with silvered surfaces or the like) to direct a portion 335 of the projected light 257 onto the projection surface 136 of the screen 130 or to spread the light 335 to cause it to pass through the shade 130 (which is translucent to transparent to light) onto walls or objects near the assembly 310. Another portion 337 is directed or focused by the lower lens 264 through the reflector 266 interior spaces onto the second or upper lens 268, which functions to direct/focus the light 339 to provide images on the ceiling surface 104.

Again, two focal distances are supported by the display system 300, and the combined teaching of systems 200 and 300 illustrates to one skilled in the art that there are many lens assembly configurations and components that can be used to focus light from a light bulb projector onto two or more surfaces in a concurrent manner to obtain desirable visual effects (e.g., focused imagery at differing distances/locations/shapes and the like).

More generally, with regard to FIG. 3, the projector light bulb shoots light upward in a fan shape that intersects the optical apparatus built into the harp. This optical apparatus spreads the light in all directions, with part of the light being spread generally horizontally so that it shines upon the shade/projection screen (or in the event the shade/screen has been removed or is omitted from the assembly upon the walls, furniture, or other nearby objects/surfaces). Light shining generally on the center part of the optical apparatus shines through a lens assembly that spreads the light generally vertically to shine on the ceiling (or objects above the projector bulb).

The examples in FIGS. 1-3 utilize lamp-type light sockets to provide a platform for powering or operating a light bulb projector. However, these projectors may be used in nearly any light bulb socket including a ceiling light fixture and its bulb socket. With this in mind, FIG. 4 illustrates a display system 400 in which a light bulb projector 450 is provided and is inserted or threaded into a socket 418 of a ceiling lighting fixture on a ceiling 409 of room 402 containing the system 400. The assembly 450 may be exposed or enclosed within a transparent to translucent globe or a screen element (similar to the rear projection screens discussed with reference to system 100 of FIG. 1).

The assembly 450 includes a threaded connector or socket adapter 452 for mating with the ceiling fixture bulb socket 418. The assembly 450 also includes a projector element 454 electrically connected to the adapter 452 to be powered (and/or controlled) via the ceiling socket 418. An outlet lens (such as rounded lens or the like) 456 is provided to focus or condition the projected light 457 in a desired manner. The room 402 includes walls 408 upon which the projected light (video or still images) 457 may be directed/focused.

The system 400 also includes an object recognition and/or tracking camera 470 (which may also be provided in the systems 100-300), which may be bore-sighted with the projector element 454. The camera 470 functions to recognize objects such as a bed 404 or a desk 406 or the like such as via infrared 471 or other techniques known in the arts. The object recognition or output of the camera 470 may be used by a controller (not shown) to control operation of the projector assembly 450. For example, the image stream provided to the camera element 454 may be modified/selected by the controller such that the projected light 457 projects images onto the recognized objects 404 and/or 406 or onto the walls 408 (or floors) of room 402.

Further, the room 402 may include one or more inhabitants (e.g., a child) 407, and the camera 470 may be used to recognize a face 409 (and even a particular face in some implementations). The output of the camera 470 can then be used to control/affect operation of the projector assembly 450 to project images selected for the person 407 and/or onto particular objects in the room 402 based on this facial recognition. For example, the assembly 450 may be used to wake up a child 407 at a particular time by projecting light/images 457 on the bed 404 and even on their face 407 (project onto particular objects in room 402 by controlling media provided to the projector element 454).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, attached directly to the light bulb projector, held or positioned above (spaced apart a predefined distance), or attached to the harp that holds the lampshade-shaped projection screen is a lens/mirror (or light conditioning) assembly that redirects the light from the projector so that it can play upon the inner or projection surface of the projection screen in a desired manner.

In each of the examples provided and others understood by those skilled in the art, an image-capture camera may be provided as separate or, more typically, integrated assemblies. Having the camera/projector assembly provided as a unit (e.g., within a light bulb device and at least functionally) helps make the display system provide a complete solution to mapping and then projecting accurately onto the configuration of a room/space and its objects (and inhabitants). The image-capture camera may be bore sighted with the projector (which might be desirable in many instances but not, required). Such a camera/projector unit may be used to allow the distortions that can (in some implementations) be calculated for projected imagery to be taken directly from the camera rather than taken through offset math software/programs (that may vary to practice the invention and will be apparent to those skilled in the art).

In some cases, though, no lampshade/screen is used such as when a lampshade is removed from the projection assembly or when the projection assembly is provided as a ceiling unit (e.g., the light bulb projector is inserted into a ceiling light fixture's socket). In these cases, the projected light can be made to project onto walls, ceiling surfaces, floor surfaces, and furniture and other objects in the space under the ceiling light fixture.

One of the differences between the proposed display system and prior projectors and the like is that all the elements needed to receive data/media to be projected, to project the data/media, and to manipulate the visual beam path are packaged into a single, small consumer product. In a simple implementation, this product/system is capable of replacing a light bulb in an ordinary socket whether it be in a movable or portable lamp such as typical household table or floor lamp or in a more permanently positioned or fixed light fixture such as a ceiling light, a porch light, or the like with a standard light socket for receiving the light bulb projector.

To summarize or provide a quick (but not limiting) synopsis, the display system is adapted for in home use and for use outside the home. The display system may include one or more components for projection, for audio transmission, and for camera-based image capture. The display system may use the camera-based image capture to perform (with software and/or hardware devices) mapping of imagery and sound sources correctly onto the surfaces to be projected onto. The display system may also perform real-time adjustment of imagery so that it appears to be correctly located in 3D-space for a key observer in the room (e.g., by processing the output of the image capture).

We claim:

1. An apparatus for projecting images, comprising:
a light bulb projector assembly comprising a bulb adapter adapted for electrical connection in a light bulb socket and a projector selectively powered by the light bulb socket via the light bulb socket, wherein the projector receives an image stream and, in response, projects light with imagery;
a lens assembly receiving the projected light and directing the projected light onto a projection surface;
a harp supporting the light bulb socket; and
a projection screen supported upon the harp with an interior surface extending about the light bulb socket and the received light bulb projector, whereby the interior surface provides at least a portion of the projection surface,
wherein the lens assembly is mounted on the harp a distance apart from the projector and comprises a mirrored reflector with an exterior surface receiving a first portion of the projected light and directing it outward toward the interior surface,
wherein the mirrored reflector is bullet shaped, and
wherein the lens assembly further includes a lens for receiving a second portion of the projected light and directing the second portion in a direction parallel to a central axis of an outlet lens of the projector, whereby the second portion is focused on a ceiling or surface above the apparatus.

2. The apparatus of claim 1, wherein the projector is first operated, prior to receiving the image stream, to project white or colored light, whereby the light bulb projector assembly illuminates a space around the apparatus.

3. The apparatus of claim 1, wherein the projection screen is translucent to the projected light.

4. The apparatus of claim 1, wherein the lens assembly comprises a rounded lens attached to the projector and spreading the projected light toward the projection surface.

5. The apparatus of claim 1, wherein the lens assembly comprises a first lens for focusing a first portion of the projected light on a portion of the projection surface at a first focal distance and further comprises a second lens for focusing a second portion of the projected light on a portion of the projection surface at a second focal distance greater than the first focal distance.

6. The apparatus of claim 1, wherein the light projector bulb assembly further includes a wireless receiver and wherein the image stream is received from a remote device via wireless communications.

\* \* \* \* \*